United States Patent
Herbstritt et al.

(10) Patent No.: US 7,499,263 B2
(45) Date of Patent: Mar. 3, 2009

(54) MOBILE POWER SOURCE CABLE CONNECTION SYSTEM AND METHOD

(75) Inventors: Dale R. Herbstritt, Clemmons, NC (US); Jiri Podsednik, Hloubetin (CZ)

(73) Assignee: Doosan Infracore Co., Ltd. (KR)

( * ) Notice: Subject to any disclaimer, the term of this patent is extended or adjusted under 35 U.S.C. 154(b) by 262 days.

(21) Appl. No.: 11/468,223

(22) Filed: Aug. 29, 2006

(65) Prior Publication Data

US 2007/0047181 A1 Mar. 1, 2007

Related U.S. Application Data

(60) Provisional application No. 60/712,575, filed on Aug. 30, 2005.

(51) Int. Cl.
*H02B 1/20* (2006.01)
*H02K 7/18* (2006.01)
*H02K 5/00* (2006.01)

(52) U.S. Cl. .................. 361/637; 361/611; 361/624; 290/1 R; 322/1

(58) Field of Classification Search ................. 361/611, 361/624, 637, 648; 290/1 R; 322/1
See application file for complete search history.

(56) References Cited

U.S. PATENT DOCUMENTS

| 4,369,946 | A  | * | 1/1983  | Palmer et al. ............. 248/74.2 |
| 5,705,917 | A  | * | 1/1998  | Scott et al. ................... 322/46 |
| 6,750,556 | B2 | * | 6/2004  | Sodemann et al. .......... 290/1 A |
| 6,801,425 | B2 | * | 10/2004 | Buck et al. .................. 361/625 |
| 2002/0047689 | A1 | * | 4/2002  | Bessho et al. .................. 322/1 |
| 2007/0296223 | A1 | * | 12/2007 | Saylor ........................ 290/1 R |
| 2008/0042625 | A1 | * | 2/2008  | Konop et al. ................... 322/1 |

* cited by examiner

*Primary Examiner*—Jayprakash N Gandhi
*Assistant Examiner*—Zachary M Pape
(74) *Attorney, Agent, or Firm*—Michael Best & Friedrich LLP

(57) ABSTRACT

A mobile power source for use with a power cable having a connector. The mobile power source includes a housing, a generator, an enclosure, at least one power terminal, a door, and at least one fastening device. The generator is mounted in the housing to generate electrical power. The at least one power terminal is mounted within the enclosure, electrically connected to the generator, and configured to receive power generated by the generator. The door is positioned over the enclosure so as to cover the at least one power terminal, and limit access to the at least one power terminal. The at least one fastening device is adjacent to the door, and configured to secure the cable.

18 Claims, 4 Drawing Sheets

MOBILE POWER SOURCE CABLE CONNECTION SYSTEM AND METHOD

RELATED APPLICATIONS

This application claims the benefit of U.S. Provisional Application Ser. No. 60/712,575 filed on Aug. 30, 2005, titled "Mobile Power Source Cable Connection System and Method," the entire content of which is incorporated by reference herein.

FIELD

Embodiments of the invention relate generally to mobile power sources, and particularly to cable connections at mobile power sources.

BACKGROUND

Mobile power sources, such as mobile or portable generators, construction or rental generators, mobile light towers, and onboard power generators, are used to provide power in many applications, such as construction, outdoor events (for example, concerts), ski resorts, and the like. Typical mobile power sources are equipped with analog and/or digital control panels that include a key start switch, hour meter, multiple position voltmeter switch, multiple position ammeter switch, output frequency indicator, output voltage indicator, message display, and diagnostic function indicators, such as a low oil pressure indicator, engine thermometer, engine temperature indicator, battery status indicator, and the like. Typical mobile power sources also include power panels that often include standard hookup terminals to deliver power generated by the generator to a connected load.

However, setting up mobile power sources to deliver power can be problematic. For example, obtaining power from a mobile power source requires that live standard hookup terminals in the mobile power source be first exposed. Cables are then hooked or connected to the exposed standard hookup terminals to obtain power. However, cables fitted with cam lock connectors cannot be connected to standard hookup terminals. In such situations, other external cables are hooked up to the live standard hookup terminals to obtain power. Since the external cables are hooked rather than fixedly secured to the terminals, the external cables are easily disconnected or separated from the hookup terminals, thus exposing the live standard hookup terminals.

Some mobile power sources provide separate metallic bars such that cables connected to standard hookup terminals can be secured. Screws and stud fasteners are often used to fasten the metallic bars to the power panels of the mobile power sources. To secure the cables to the power panels, the metallic bars first have to be removed from the power panels. The cables are then connected to the hookup terminals. The metallic bars are then re-secured to the power panels with the screws and stud fasteners.

The separate metallic bars, screws, and stud fasteners are susceptible to rusting and other environmental conditions such as corrosion. Once rusted, metallic bars, screws, and stud fasteners are difficult to remove. In addition, the separate metallic bars often obstruct access to the hookup terminals, making it difficult to replace connected cables with new cables. As a result, the separate metallic bars, screws, and stud fasteners are often removed and discarded by users. Without separate metallic bars, cables connected to the live standard hookup terminals may be subject to abrasion. Abraded cables may leave conductors therein exposed. Moreover, without the separate bars, the live hookup terminals may be exposed.

SUMMARY

In one embodiment, the invention provides a mobile power source for use with a power cable having a connector. The mobile power source includes a housing, a generator, an enclosure, at least one power terminal, a door, and at least one fastening device. The generator is mounted in the housing to generate electrical power. The at least one power terminal is mounted within the enclosure, and is electrically connected to the generator to receive power generated by the generator. The door is positioned over the enclosure so as to cover the at least one power terminal, and limit access to the at least one power terminal. The at least one fastening device is adjacent to the door, and is configured to secure the cable.

In another embodiment, the invention provides a mobile power source for use with a power cable having a connector. The mobile power source includes a housing, a generator, a buss bar, a receptacle, a door, and a fastener. The generator is mounted in the housing to generate electrical power. The buss bar is mounted in the housing, and is electrically connected to the generator to receive power from the generator. The receptacle can be removably connected to the buss bar and the connector of the cable. The door covers the receptacle and the buss bar, and limits access to the receptacle and the buss bar. The door also includes an aperture through which the cable can be inserted. The fastener is positioned adjacent to the aperture to secure the cable.

In another embodiment, the invention provides a method of providing power from a mobile power source to a power cable having a connector. The mobile power source has a generator and a buss bar to receive power from the generator. The method includes connecting a receptacle to the buss bar, connecting the connector of the cable to the receptacle, and providing a door with a first position in which the door substantially covers the connector and the buss bar, and a second position in which the connector and the buss bar are exposed, thereby limiting access to the connector and the buss bar. The method also includes generating electrical power at the generator.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Embodiments of the invention will also be described with reference to the accompanying drawing figures wherein like numbers represent like elements throughout. Certain terminology, for example, "top," "bottom," "right," "left," "front," "frontward," "forward," "back," "rear," and "rearward," is used in the following description for relative descriptive clarity only and is not intended to be limiting.

Embodiments of the invention relate to mobile power sources providing power through power terminals and cables having connectors. In one specific embodiment, the mobile power source includes a housing, a generator, an enclosure, a power terminal mounted in the enclosure, a door, and a fastening device. The generator is mounted in the housing and provides electrical power to a cable connected to the power terminal. The door is positioned over the enclosure to limit access to the power terminal. The fastening device is positioned adjacent to the door and secures the cable.

Figure 1:
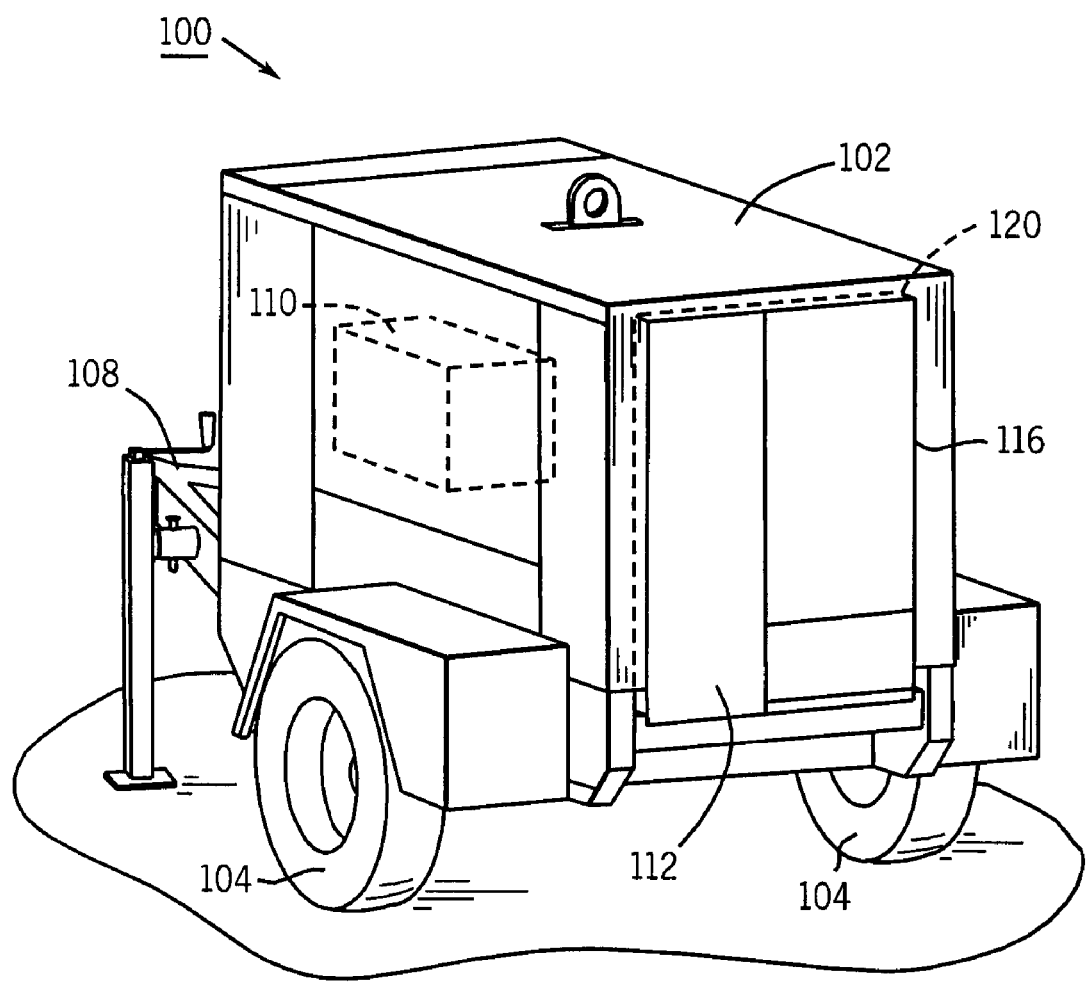
FIG. 1 illustrates a mobile generator.

FIG. 1 shows an exemplary mobile power source 100 that has a housing 102. The mobile power source 100 can be implemented as, for example, a mobile or portable generator, construction or rental generator, mobile light tower, and onboard power generator. Although the mobile power source 100 is shown to be mobile on a pair of wheels 104 and equipped with a trailer hitch 108, the mobile power source 100 may not have wheels, or may have additional wheels. The mobile power source 100 has a generator 110 mounted in the housing 102 to generate electrical power. In some embodiments, the generator 110 can have a power rating between about 20 KVA to about 625 KVA. The mobile power source 100 has a control panel 112 positioned adjacent to a power terminal panel 116. The control panel 112 and power terminal 116 are mounted in an enclosure 120 positioned in the housing 102. Although FIG. 1 shows that the control panel 112 is positioned adjacent to the power terminal panel 116, the control panel 112 can be spaced apart from the power terminal panel 116.

Figure 2:
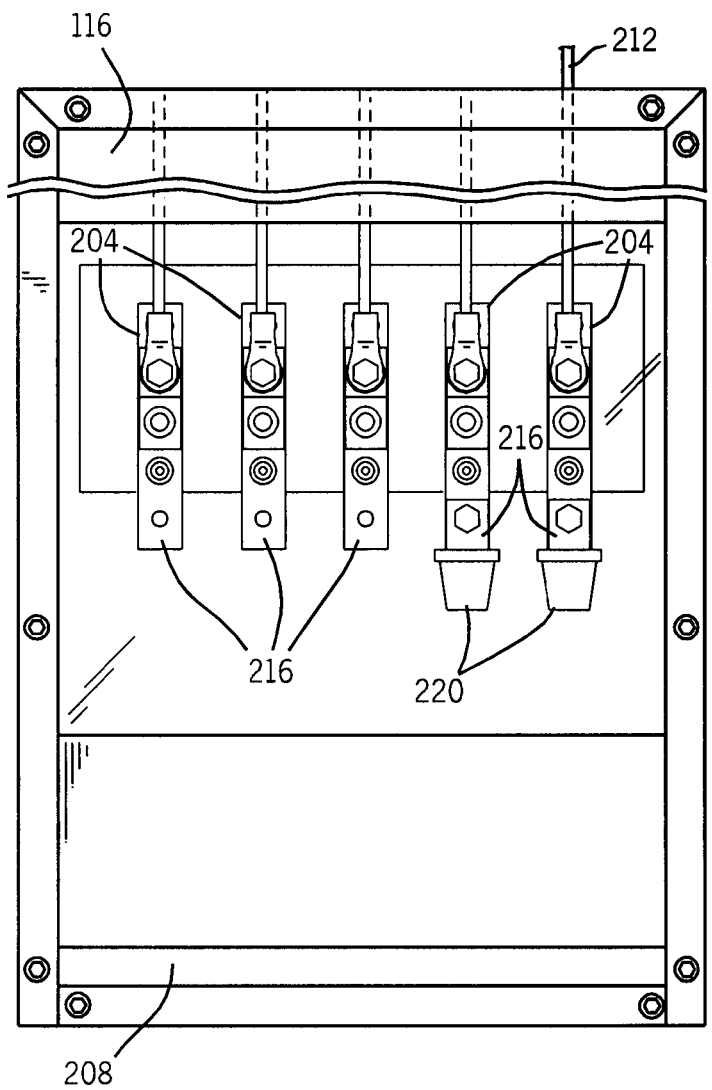
FIG. 2 is a front view of a power terminal panel adapted to be incorporated in the mobile generator of FIG. 1.
Figure 3:
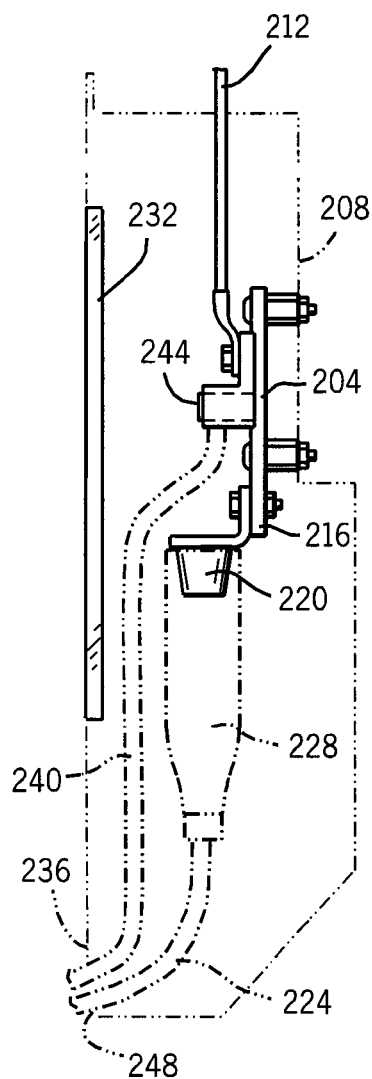
FIG. 3 is a side view of the power terminal panel of FIG. 2.

FIG. 2 and FIG. 3 show a portion of respective front and side views of the power terminal panel 116 of FIG. 1 according to an embodiment of the invention. The power terminal panel 116 is mounted in a recessed enclosure 208, and includes a set of buss bars 204 incorporated thereon. The buss bars 204 are interconnected to a circuit breaker (not shown) with a conductor 212 to receive power from the generator 110 of FIG. 1. The power terminal panel 116 also includes a plurality of power terminals 216 that are connected to the buss bars 204. In the embodiment shown, two plugs or cam lock receptacles 220 are mounted on two of the power terminals 216, thus leaving other power terminals 216 without cam lock receptacles. In this way, cables with cam lock connectors can be connected to the cam lock receptacles 220 and the power terminals 216, while other standard power cables can be connected to the other power terminals 216 having standard connectors or power hookups. Although two cam lock receptacles 220 are shown in FIG. 2, more or fewer cam lock receptacles 220, power terminals 216, and buss bars 204 can also be used. Furthermore, different conductor sizes and other power terminal types can also be provided by the power terminal panel 116 to meet different power or current rating requirements.

FIG. 3 shows that the recessed enclosure 208 is sized to accommodate a number of the cam lock receptacles 220 on the power terminals 216. In some embodiments, the enclosure 208 is generally metallic. A view door 232 is hinged and fixedly mounted on the enclosure 208 such that the terminals 216 can be viewed externally. In some embodiments, the view door 232 is made of Plexiglas. The view door 232 is also sized to cover the power terminals 216 and the cam lock receptacles 220, thereby limiting finger access to the enclosure 208. In this way, the power terminals 216 and the cam lock receptacles 220 are essentially inaccessible without using tools to open the view door 232. In other embodiments, the view door 232 is secured to the enclosure 208 via a lock. Accordingly, when the view door 232 is unlocked, a user can open the view door 232 to access the power terminals 216 and the cam lock receptacles 220. In such embodiments, tools may or may not be needed in connection with unlocking or locking of the view door 232.

When a user needs to connect a cam lock receptacle 220 to a power terminal 216, the user first uses a tool to open the view door 232. After opening the view door 232, the user connects, secures, or fastens the cam lock receptacle 220 to an available power terminal 216. The user can then connect, secure, or fasten a cable fitted with a cam lock plug or connector to the cam lock receptacle 220, or another cable not fitted with a cam lock connector to one of the power hookup terminals 216. After the user has connected the cable to one of the power terminals 216 or cam lock receptacles 220, the user re-secures the view door 232 to the enclosure 208 with the tool.

After the user has re-secured the view door 232 to the enclosure 208, the cable protrudes from the enclosure 208 through an aperture or a cable entry 236 defined on or below the view door 232. Although FIG. 3 shows that the cable entry 236 is defined at the bottom of the view door 232, the cable entry 236 can also be defined in other locations of the view door 232. Furthermore, although the embodiment shown in FIG. 3 includes one cable entry 236 generally spanning across the width of the view door 232, the enclosure 208 can include more cable entries 236 of different dimensions defined on different locations of the view door 232. In such cases, for example, one of the cable entries 236 can be sized for two or more connected cables, while another one of the cable entries 236 can be sized for only one connected cable. In this way, entangling of cables near the power terminal panel 116 is reduced.

FIG. 3 also shows an exemplary cable 224 fitted with a cam lock plug or connector 228 secured or connected to one of the cam lock receptacles 220, and dispensed through the cable entry 236. Another exemplary cable 240 fitted with a connecting lug 244 is shown as connected to one of the power terminals 216, and dispensed through the cable entry 236. In some embodiments, the size of the cable entry 236 is such that the connected cables 224, 240 have a limited range of motion. Furthermore, the distance from the cable entry 236 to the cam lock receptacles 220 and the power terminals 216 is such that finger access can be substantially prevented unless the view door 232 is opened with a tool.

Figure 4:
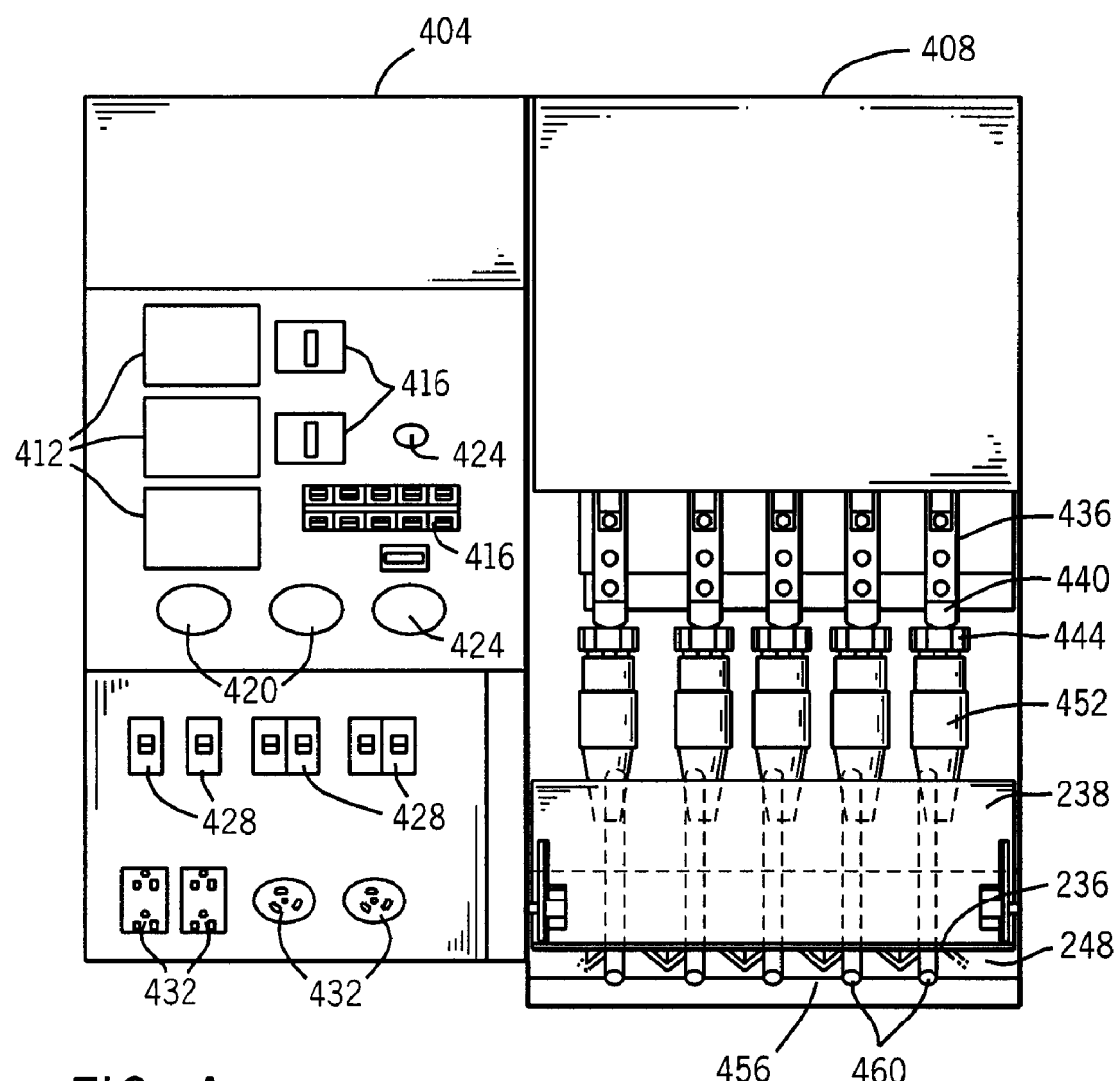
FIG. 4 is a front view of a second control panel and a second power terminal panel adapted to be incorporated in the mobile generator of FIG. 1.

FIG. 4 is a front view of a second control panel 404 and a second power terminal panel 408 that can be mounted or incorporated in the enclosure 120 of the mobile power source 100 of FIG. 1. The second control panel 404 includes a plurality of meters 412 such as an ammeter, a frequency meter, and a voltmeter. Adjacent to the meters 412 are a plurality of switches 416, gauges 420, and buttons 424. The second control panel 404 also includes a plurality of fuse switches 428 and a plurality of outlets 432. The second power terminal panel 408 includes a plurality of buss bars 436, such as those described with respect to FIG. 2. Each of the buss bars 436 is connected to a live terminal 440 and a cam lock receptacle 444. In the embodiment shown, the cam lock receptacles 444 are connected to cables (not shown) having cam lock plugs or connectors 452. The cable entry 236 is equipped with a hinged cable entry door 238, and an opening 248 that remains accessible when the cable entry door 238 is closed. A plurality of securing members or fastening devices such as clamps 456 and wires 460 are mounted at the bottom of the cable entry 236 such that cables can be locked and secured with the fastening devices at the opening 248 when the cable entry door 238 is closed.

Figure 5:
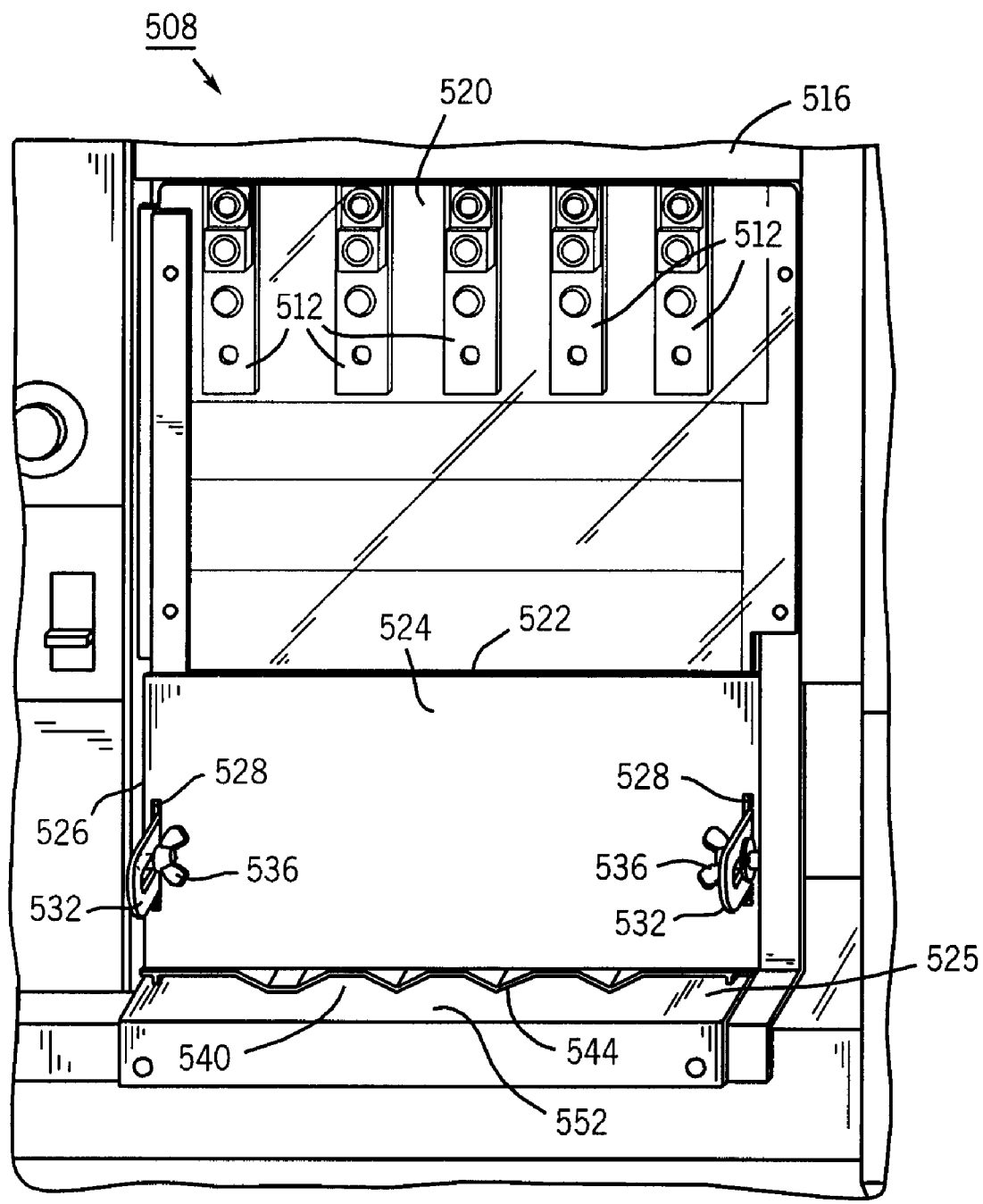
FIG. 5 is a perspective view of a portion of a third power terminal panel having an enclosure.

FIG. 5 shows a perspective view of a portion of a third power terminal panel 508. FIG. 5 shows a plurality of power terminals 512 in an enclosure 516 without any cam lock receptacles mounted on the power terminals 512. The power terminals 512 are substantially inaccessible without opening an enclosure door 520 or a cable entry door 524 that partially covers a cable entry 525. Together, the enclosure door 520 and the cable entry door 524 cover the enclosure 516. In some embodiments, the enclosure door 520 is a Plexiglas door. The cable entry door 524 is pivotably connected to the enclosure door 520, and can move between a closed position (as shown in FIG. 5) and an open position that allows access to cables that are connected to the terminals 512. In some embodiments, the cable entry door 524 is a metallic door. Although the cable entry door 524 is shown as pivoted at a top 522 of the cable entry 525, the cable entry door 524 can also be pivoted near a side 526 of the cable entry 525.

In the embodiment shown, a plurality of sliders 532 are mounted in the enclosure 516. The sliders 532 protrude from the interior of the enclosure 516 to the exterior of the enclosure 516 through a plurality of slots 528 defined on the cable entry door 524. For example, when the cable entry door 524 is in a closed position, the cable entry door 524 substantially covers the cable entry 525, and can be locked with a plurality of studs and wing nuts 536 fastened to the sliders 532. Conversely, when the cable entry door 524 is in an opened position, the cable entry 525 is substantially left uncovered. In some embodiments, the studs are M6 studs, and the sliders 532 are stainless steel sliders. The cable entry door 524 is generally difficult to remove without tools. Furthermore, having the studs and wing nuts 536 fastened to the sliders 532 limits the range of motion by the cable entry door 524. Positioned below the cable entry door 524 is an opening 540 allowing a plurality of cables to enter the interior of the enclosure 516. To secure such cables, a plurality of securing members such as wire clamps 544 are mounted near the bottom of the cable entry 525. In some embodiments, when the cable entry door 524 is closed, the cable entry door 524 presses the cables against the clamps 544 such that the clamps 544 can secure the cables near the opening 540. In some embodiments, the wire clamps 544 are comb-type metallic clamps. In other embodiments, a user can secure the cables with the clamps 544 while the cable entry door 524 is opened, and can close the cable entry door 524 to further limit cable movements and finger access. In this way, together with the wire clamps 544, the cable entry door 524 secure the cables to a bottom plate 552 of the enclosure 516. The cables thus will have a limited range of motion, and the power terminals 512 are substantially inaccessible.

In embodiments that include the cable entry door 524 and the clamps 544, a user first loosens the wing nuts 536 on the studs from the sliders 532, opens the cable entry door 524, and unlocks and removes the enclosure door 520 to allow for cam lock connections. The user then connects a number of cam lock receptacles 220 (see FIG. 2) to the power terminals 512. The user then inserts cables equipped with cam lock connectors through the opening 540 via the cable entry door 524, and connects the cables to any available cam lock receptacles. Subsequently, the user secures the cables with the clamps 544, re-secures the enclosure door 520 to the enclosure 516, re-secures the cable entry door 524, and fastens the studs and wing nuts 536 to the sliders 532. In this way, the cables are also secured by the securing members when the cable entry door 524 is locked in place. In some embodiments, the enclosure door 520 is sufficiently transparent so that the user can also view how the cables are connected. Since the cable entry door 524 has a limited range of motion, the power terminals 512 are essentially inaccessible even when the cable entry door 524 is opened by a user.

Various features and advantages of the invention are set forth in the following claims.

What is claimed is:

1. A mobile power source for use with a power cable having a connector, the mobile power source comprising:
   a housing;
   a generator mounted in the housing and configured to generate electrical power;
   an enclosure positioned in the housing;
   at least one power terminal mounted within the enclosure, the terminal comprises a buss bar electrically connected to the generator, and configured to receive power generated by the generator;
   a door positioned over the enclosure so as to cover the at least one power terminal, and limit access to the at least one power terminal; and
   at least one fastening device, adjacent to the door, and configured to secure the cable.

2. The mobile power source of claim 1, wherein the door is hinged on the enclosure.

3. The mobile power source of claim 1, wherein the connector of the cable comprises a cam lock receptacle.

4. The mobile power source of claim 1, wherein the at least one fastening device comprises a comb-type clamp.

5. A mobile power source for use with a power cable having a connector, the mobile power source comprising:
   a housing:
   a generator mounted in the housing and configured to generate electrical power;
   an enclosure positioned in the housing:
   at least one power terminal mounted within the enclosure, electrically connected to the generator, and configured to receive power generated by the generator;
   a door positioned over the enclosure so as to cover the at least one power terminal, and limit access to the at least one power terminal;
   at least one fastening device adjacent to the door, and configured to secure the Cable; and
   a plug configured to be removably connected to the at least one power terminal and the connector of the cable.

6. The mobile power source of claim 5, wherein the plug comprises a cam lock connector.

7. A mobile power source for use with a power cable having a connector, the mobile power source comprising:
   a housing:
   a generator mounted in the housing and configured to generate electrical power:
   an enclosure positioned in the housing:

at least one power terminal mounted within the enclosure, electrically connected to the generator, and configured to receive power generated by the generator:

a door positioned over the enclosure so as to cover the at least one power terminal, and limit access to the at least one power terminal;

at least one fastening device adjacent to the door, and configured to secure the cable; and an aperture defined on the door through which the cable is inserted into the enclosure.

8. The mobile power source of claim 7, further comprising a second door having a first position in which the second door substantially covers the aperture, and a second position in which at least a portion of the aperture is exposed, wherein the first position is different from the second position.

9. The mobile power source of claim 8, further comprising a slider extending from the enclosure, and wherein the second door comprises a slot therein configured to receive the slider when the second door is in the first position.

10. The mobile power source of claim 8, wherein the cable is secured by the fastening device when the second door is in the first position.

11. A mobile power source for use with a power cable having a connector, the mobile power source comprising:

a housing;

a generator mounted in the housing and configured to generate electrical power;

a buss bar mounted in the housing, electrically connected to the generator, and configured to receive power from the generator;

a receptacle configured to be removably connected to the buss bar and the connector of the cable;

a door covering the receptacle and the buss bar, and limiting access to the receptacle and the buss bar, the door including an aperture through which the cable can be inserted; and a fastener positioned adjacent to the aperture and configured to secure the cable.

12. The mobile power source of claim 11, wherein the housing comprises an enclosure in which the buss bar and receptacle are positioned.

13. The mobile power source of claim 11, wherein the fastener comprises a comb-type clamp.

14. The mobile power source of claim 11, further comprising a second door having a first position in which the second door substantially covers the aperture, and a second position in which the aperture is left substantially uncovered.

15. The mobile power source of claim 14, further comprising a slider protruding through a slot defined on the second door to lock the second door in the first position.

16. The mobile power source of claim 14, wherein the second door is in the first position when the cable is connected to the receptacle.

17. A method of providing power from a mobile power source to a power cable having a connector, the mobile power source having a generator and a buss bar to receive power from the generator, the method comprising:

providing a door with a first position in which the door substantially covers the connector and the buss bar, and a second position in which the connector and the buss bar are exposed thereby selectively limiting access to the connector and the buss bar;

moving the door to the second position;

connecting a receptacle to the buss bar;

connecting the connector of the cable to the receptacle;

moving the door to the first position; and generating electrical power at the generator.

18. The method of claim 17, wherein the mobile power source has an enclosure receiving the connector and the buss bar, the method further comprising fastening the cable to the enclosure with a comb-type clamp.

* * * * *